United States Patent
Lee et al.

(10) Patent No.: US 8,385,945 B2
(45) Date of Patent: Feb. 26, 2013

(54) COMMUNICATION SIGNAL TRANSMISSION MANAGEMENT SYSTEM AND METHOD OF BASE STATION

(75) Inventors: Hou-Hsien Lee, Taipei Hsien (TW); Chang-Jung Lee, Taipei Hsien (TW); Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 243 days.

(21) Appl. No.: 12/970,958

(22) Filed: Dec. 17, 2010

(65) Prior Publication Data

US 2011/0269488 A1 Nov. 3, 2011

(30) Foreign Application Priority Data

Apr. 28, 2010 (TW) ................................ 99113581 A

(51) Int. Cl.
*H04W 24/00* (2009.01)
(52) U.S. Cl. .................. 455/456.5; 455/456.1; 455/440; 455/500
(58) Field of Classification Search .................. 455/500, 455/524, 412.1, 414.2, 426.2, 456.5, 456.1, 455/3.01, 561, 440, 404.2, 458; 370/516, 370/508, 509, 328, 229
See application file for complete search history.

(56) References Cited

U.S. PATENT DOCUMENTS

| 7,375,629 | B1 * | 5/2008 | Moyer | 340/539.13 |
| 2004/0184487 | A1 * | 9/2004 | Kim | 370/516 |
| 2007/0025293 | A1 * | 2/2007 | Choi | 370/331 |

* cited by examiner

*Primary Examiner* — John J Lee
(74) *Attorney, Agent, or Firm* — Altis Law Group, Inc.

(57) ABSTRACT

A communication signal transmission management method of a base station using a computing device configures a distance table for recording remote base stations proximate the base station and a distance between the base station and each of the remote base stations, and stores the distance table in a storage system of the computing device. When the base receives a communication signal from communication device, the method determines a remote base station to receive the communication signal according to the distance between the base station and each of the scanned remote base stations and a current load of each remote base station, and transmits the communication signal to the determined remote base station.

16 Claims, 4 Drawing Sheets

| No | Remote base station | Distance |
|---|---|---|
| 1 | B | 520m |
| 2 | C | 636m |
| 3 | D | 986m |
| ⋮ | ⋮ | ⋮ |

FIG. 3

COMMUNICATION SIGNAL TRANSMISSION MANAGEMENT SYSTEM AND METHOD OF BASE STATION

BACKGROUND

1. Technical Field

Embodiments of the present disclosure relate generally to signal transmission, and more particularly, to a communication signal transmission management system and method of a base station.

2. Description of Related Art

When a base station receives a communication signal from a communication device, such as, a mobile phone or a computer, the base station determines a transmission path to transmit the communication signal to a destination base station according to signal strength of remote base stations proximate the base station. However, the determined transmission path according to the signal strength may not be the best transmission path.

BRIEF DESCRIPTION OF THE DRAWINGS

FIG. 3 is a schematic diagram illustrating a configuration table of the base station.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
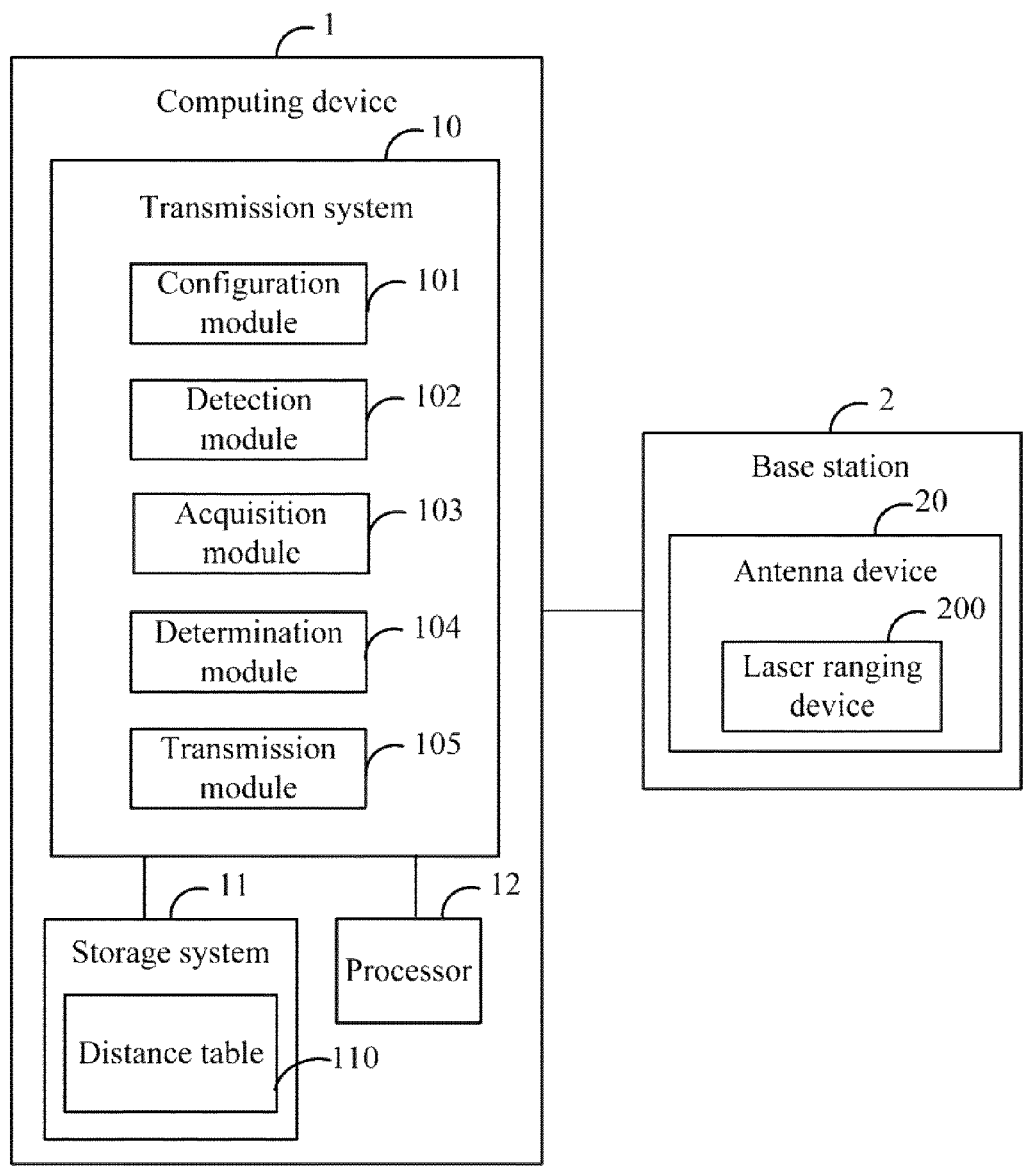
FIG. 1 is a block diagram of one embodiment of a computing device of a base station.

FIG. 1 is a block diagram of one embodiment of a computing device 1 of a base station 2. In the embodiment, the computing device 1 includes a transmission system 10, a storage system 11, and a processor 12. The computing device 1 may be a host of the base station 2, which may be a computer or a server electronically or wirelessly connected with the base station 2. It should be apparent that FIG. 1 is only one example of architecture of the computing device 1 that can be included with more or fewer components than shown in other embodiments, or a different configuration of the various components.

In one embodiment, the base station 2 includes an antenna device 20 for receiving communication signals from communication devices around the base station 2. The antenna device 20 may consist of a plurality of antennas to provide a communication function of the base station 2 with remote base stations and the communication devices. Additionally, a laser ranging device 200 is equipped on the antenna device 20. The laser ranging device 20 is configured to scan the remote base stations in communication with the base station 2, and measure a distance between the base station 2 and each of the remote base stations. In the embodiment, the laser ranging device 200 is a laser projector, which measures a distance between the projector and an object. The laser ranging device 200 sends out hundreds of lasers towards the object. The projector also collects the refracted lasers from the object and then computes the distance between the projector and the object.

The storage system 11 stores one or more programs, such as programs of an operating system, and other applications of the computing device 1. A distance table 110 is established and stored in the storage system 11 to record the measured distance between the base station 2 and each of the remote base stations. Details of the distance table 110 are provided below. In one embodiment, the storage system 11 may be random access memory (RAM) for temporary storage of information, and/or a read only memory (ROM) for permanent storage of information. In other embodiments, the storage system 11 may also be an external storage device, such as a hard disk, a storage card, or a data storage medium. The processor 12 executes one or more computerized operations of the computing device 1 and other applications, to provide functions of the computing device 1.

The transmission system 10 may include a plurality of functional modules comprising one or more computerized instructions that are stored in the storage system 11 or a computer-readable medium of the computing device 1, and executed by the processor 12 to perform operations of the computing device 1. In one embodiment, the transmission system 10 includes a configuration module 101, a detection module 102, an acquisition module 103, a determination module 104, and a transmission module 105. In general, the word "module", as used herein, refers to logic embodied in hardware or firmware, or to a collection of software instructions, written in a programming language, such as, Java, C, or Assembly. One or more software instructions in the modules may be embedded in firmware, such as EPROM. The modules described herein may be implemented as either software and/or hardware modules and may be stored in any type of computer-readable medium or other storage device.

The configuration module 101 is operable to configure the distance table 110 of the base station 2, and store the distance table 110 in the storage system 11. In order to configure a distance table 110, the configuration module 101 triggers the laser ranging device 200 to scan the remote base stations proximate the base station 2, measures a distance between each of the scanned remote base stations and the base station 2, and records the measured distances and the remote base stations into the distance table 110 according to a distance order. In the embodiment, each of the remote base stations proximate the base station 2 can be scanned by the laser ranging device 200. The distance order is a sequence from a minimum distance to a maximal distance between the base station 2 and the remote base stations.

With respect to FIG. 3, is one example of the distance table 110 recording different distances between the base station 2 and each of the remote base stations. For example, the distance between the base station 2 and a remote base station B may be 520 meters, and the distance between the base station 2 and a remote base station C may be 636 meters. The configuration module 101 may update information of the distance table 110 when the remote base stations proximate the base station 2 are changed, such as, a new remote base station is located, or one or more remote base stations are interrupted or damaged.

The detection module 102 is operable to detect whether a destination of a communication signal is the base station 2 when the communication signal is received from a communication device around the base station 2. In one embodiment, the communication signal may be sent from a mobile phone, a computer, or other communication device. Each communication device may be registered on a base station nearby to connect to a communication network when the communication device is used in a new region at the first time. A server of the communication network may record registration information of the communication device to provide to base stations of the communication network. Therefore, the detection module 102 may detect whether the destination of the communication signal is the base station 2 according to the registration information recorded by the server.

Figure 4:
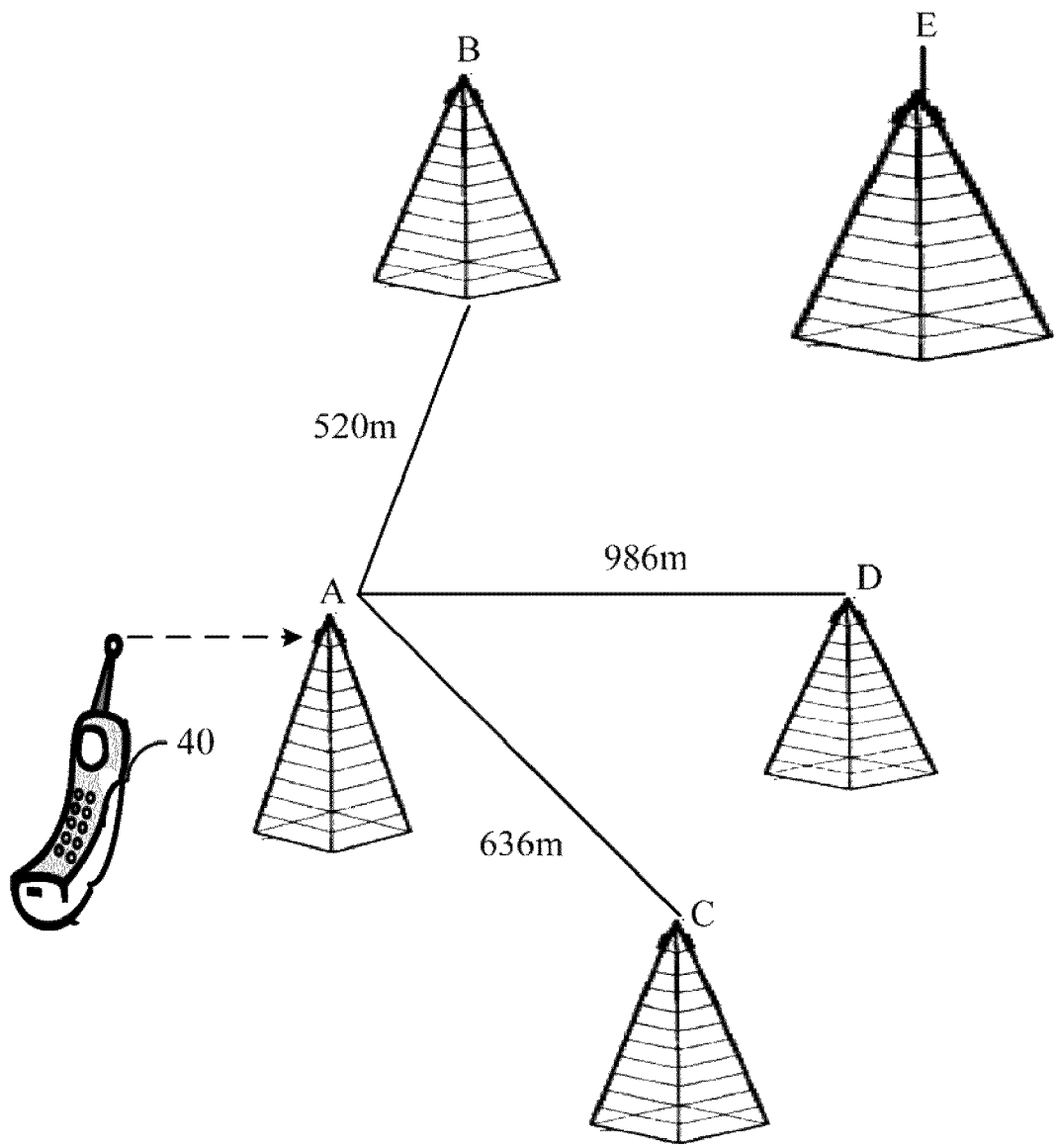
FIG. 4 is a schematic diagram illustrating an example of a communication signal transmission among base stations.

In one example with the respect to FIG. 4, assuming that the base station A is the base station 2, and a mobile phone 40 sends the communication signal to the base station 2 to communicate with another mobile phone of which the phone number is "158xxxx3162". Then the detection module 102 detects that the mobile phone having the phone number of "158xxxx3162" is registered on a base station E by searching the registration information of the server. Therefore, the detection module 102 determines that the destination of the communication signal is not the base station 2.

The detection module 102 is further operable to detect whether the destination is any remote base station recorded in the distance table 110 if the destination is not the base station 2. Upon the condition that the destination is a remote base station recorded in the distance table 110, the transmission module 105 transmits the communication signal to the remote base station corresponding to the detected destination recorded in the distance table 110. In one embodiment, if the destination is one of the remote base stations recorded in the distance table 110, it denotes that the base station 2 can scan the destination and transmit the communication signal to the destination directly. Otherwise, if the destination is none of the remote base stations recorded in the distance table 110, it denotes that the base station 2 cannot scan the destination and transmit the communication signal to the destination directly, so a better transmit path needs to be determined to transmit the communication signal till the communication signal is transmitted to the destination.

The acquisition module 103 is operable to acquire a current load of each of the remote base stations recorded in the distance table 110. The current load of each remote base station denotes a work state of each remote base station. For example, if a current load of a remote base station is greater than 95%, it denotes that the remote base station is busy working, and not suitable to accept other signal transmission tasks. In one embodiment, the base station 2 may send a communication packet to each of the remote base stations at intervals (e.g., 2 milliseconds), to keep communication with the remote base stations. Then the remote base stations may send back a response packet including load information of each remote base station to the base station 2 after receiving the communication packet. Therefore, the acquisition module 103 may acquire the current load of each remote base station from the response packet.

The determination module 104 is operable to determine a remote base station recorded in the distance table 110 to receive the communication signal according to the distances recorded in the distance table 110 and the acquired current load of each remote base station. In one embodiment, the determination module 104 detects whether the current load of each remote base station is less than a determined value (e.g., 90%) according to the distance order of the remote base stations in the distance table 110. When a current load of a remote base station is less than the determined value, the remote base station is determined to transmit the communication signal.

In one example with the respect to FIG. 3, the determination module 104 may check a current load of each of the remote base stations recorded in the distance table 100 one by one according the distance order, and determine a remote base station for receiving the communication signal when the current load of the remote base station is checked less than the determined value. For example, if the current load of remote base station B is less than the determined value, the remote base B is determined to receive the communication signal. Otherwise, if the current load of the remote base station B is not less than the determined value, the determination module 104 may further check the current load of remote base station C, D, and other remote base stations according to the distance order until a remote base station is determined to receive the communication signal. Additionally, if the current load of each of the remote base stations is not less than the determined value, the determination module 104 determines the remote base station B to receive the communication signal.

The transmission module 105 is operable to transmit the communication signal to the determined remote base station. In one embodiment, when the determined remote base station receives the communication signal, a transmission system of the determined remote base station performs the actions that the transmission system 10 performed to transmit the received communication signal until the communication signal is transmitted to the destination.

Figure 2:
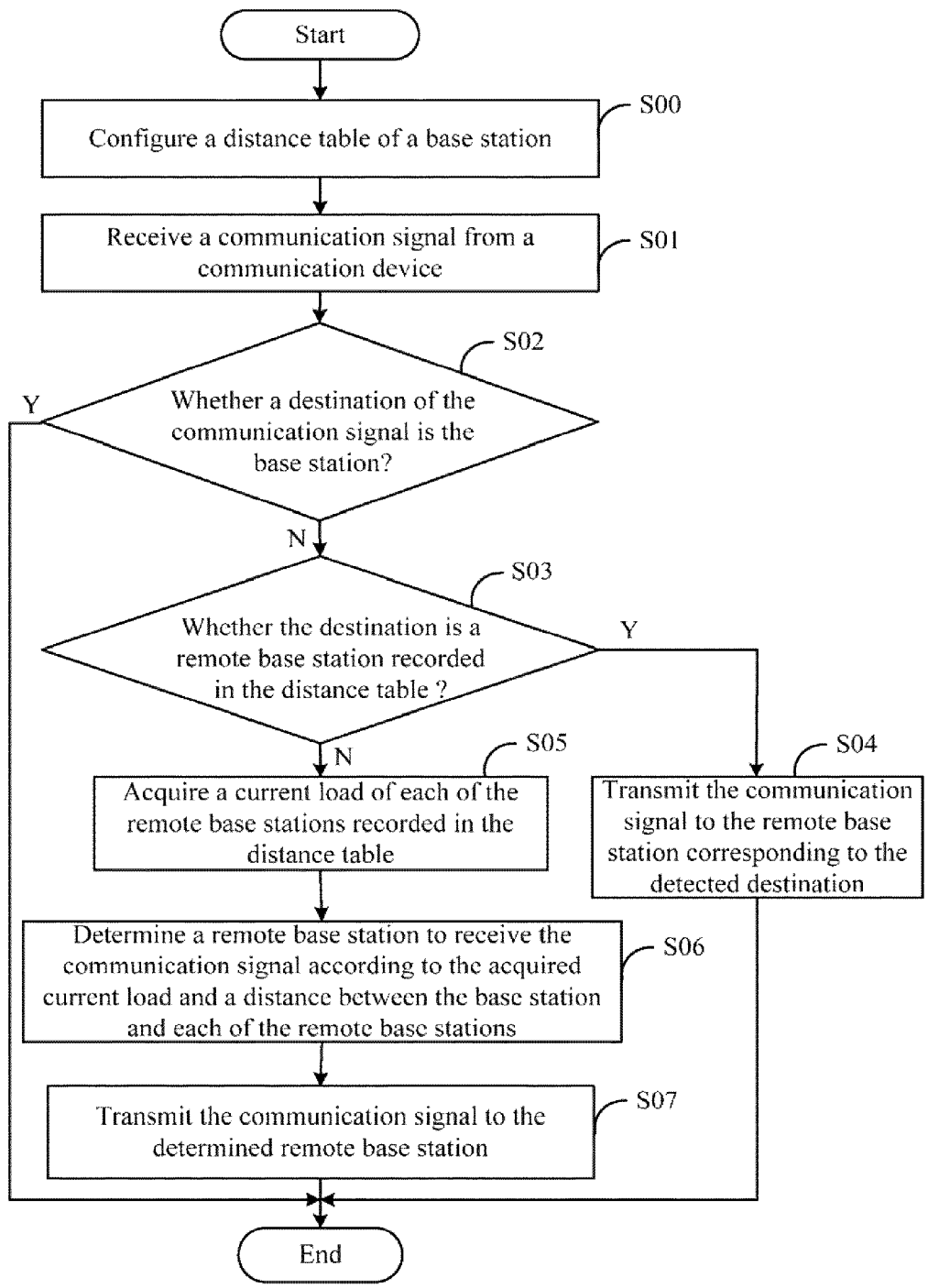
FIG. 2 is a flowchart of one embodiment of a communication signal transmission management method of a base station using the computing device of FIG. 1.

FIG. 2 is a flowchart of one embodiment of a communication signal transmission management method using the computing device 1 of FIG. 1. Depending on the embodiment, additional blocks may be added, others removed, and the ordering of the blocks, may be changed.

In block S00, the configuration module 101 configures a distance table 110 of the base station 2, and stores the distance table 110 in the storage system 11. In order to configure the distance table 110 of the base station 2, the configuration module 101 triggers the laser ranging device 200 to scan remote base stations proximate the base station 2, measures a distance between each of the scanned remote base stations and the base station 2, and records the measured distances and the remote base stations into the distance table 100 according to a distance order. The distance order is a sequence from a minimum distance to a maximal distance between the base station 2 and the scanned remote base stations. In one embodiment, the configuration module 101 may further update information of the distance table 110 when the remote base stations proximate the base station 2 are changed, such as, a new remote base station is located, or one or more remote base stations are interrupted or damaged.

In block S01, the base station 2 receives a communication signal from a communication device around the base station 2.

In block S02, the detection module 102 detects whether a destination of the communication signal is the base station 2. If the destination is the base station 2, the procedure ends. Otherwise, if the destination is not the base station 2, block S03 is implemented.

In block S03, the detection module 102 detects whether the destination is any remote base station recorded in the distance table 110. If the destination is one of the remote base stations recorded in the distance table 110, block S04 is implemented. Otherwise, if the destination is none of the remote base stations, block S05 is implemented.

In block S04, the transmission module 105 transmits the communication signal to the remote base station corresponding to the detected destination recorded in the distance table 110, and the procedure ends.

In block S05, the acquisition module 103 acquires a current load of each of the remote base stations recorded in the distance table 110. The current load of each remote base station denotes a work state of each base station. For example, if a current load of a remote base station is greater than 95%, it denotes that the remote base station is working busy, and not suitable to accept other signal transmission tasks. The current load of each remote base station may be acquired as described above.

In block S06, the determination module 104 determines a remote base station recorded in the distance table 110 to receive the communication signal according to the distances recorded in the distance table 110 and the acquired current load of each remote base station. Details of determining the remote base station are provided above.

In block S07, the transmission module 105 transmits the communication signal to the determined remote base station. In one embodiment, when the determined remote base station receives the communication signal, blocks S00 to S07 are performed by the determined base station to transmit the received communication signal until the communication signal is transmitted to the destination.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A communication signal transmission management method of a base station using a computing device, the method comprising:
   (a) configuring a distance table for recording a plurality of remote base stations proximate the base station and a distance between the base station and each of the remote base stations, and storing the distance table in a storage system of the computing device;
   (b) receiving a communication signal from a communication device around the base station;
   (c) detecting whether a destination of the communication signal is the base station;
   (d) detecting whether the destination is any remote base station recorded in the distance table if the destination is not the base station;
   (e) upon the condition that the destination is one of the remote base stations recorded the distance table, transmitting the communication signal to the remote base station corresponding to the detected destination; or
   upon the condition that the destination is none of the remote base stations recorded in the distance table, executing block (f) to (h):
   (f) acquiring a current load of each of the remote base stations recorded in the distance table;
   (g) determining one of the remote base stations to receive the communication signal according to the acquired current load and the distance between the base station and each of the remote base stations; and
   (h) transmitting the communication signal to the determined remote base station.

2. The method according to claim 1, wherein the block (a) comprises:
   triggering a laser ranging device of the base station to scan the remote base stations proximate the base station;
   measuring the distance between the base station and each of the scanned remote base stations; and
   recording the distance and the scanned remote base stations in the distance table according to a distance order from a minimum distance to a maximal distance between the base station and each of the remote base stations.

3. The method according to claim 2, wherein the block (g) comprises:
   checking whether the current load of each of the remote base stations is less than a determined value one by one according to the distance order; and
   determining a remote base station for receiving the communication signal when the current load of the remote base station is checked less than the determined value.

4. The method according to claim 1, further comprising:
   updating information of the distance table when the remote base stations proximate the base station are changed.

5. The method according to claim 1, wherein the computing device is a computer or a server electronically or wirelessly connected with the base station.

6. A computing device for managing communication signal transmission of a base station, the computing device comprising:
   a storage system;
   at least one processor; and
   one or more programs stored in the storage system and being executable by the at least one processor, the one or more programs comprising:
   a configuration module operable to configure a distance table for recording a plurality of remote base stations proximate the base station and a distance between the base station and each of the remote base stations, and store the distance table in the storage system;
   a detection module operable to detect whether a destination of a communication signal is the base station when the base station receives the communication signal, and detect whether the destination is any remote base station recorded in the distance table if the destination is not the base station;
   an acquisition module operable to acquire a current load of each of the remote base stations recorded in the distance table if the destination is none of the remote base stations;
   a determination module operable to determine one of the remote base stations to receive the communication signal according to the acquired current load and the distance between the base station and each of the remote base stations; and
   a transmission module operable to transmit the communication signal to the determined remote base station.

7. The computing device according to claim 6, wherein the transmission module further operable to transmit the communication signal to a remote base station recorded in the distance table upon the condition that the remote base station is detected to be the destination.

8. The computing device according to claim 7, wherein the computing device is a computer or a server electronically or wirelessly connected with the base station.

9. The computing device according to claim 6, wherein the configuration module further operable to trigger a laser ranging device of the base station to scan the remote base stations proximate the base station, measure the distance between the base station and each of the scanned remote base stations, and record the distance and the scanned remote base stations in the distance table according to a distance order from a minimum distance to a maximal distance between the base station and each of the remote base stations.

10. The computing device according to claim 9, wherein the determination module is further operable to check whether the current load of each of the remote base stations is less than a determined value one by one according to the distance order, and determine a remote base station for receiving the communication signal when the current load of the remote base station is checked less than the determined value.

11. The computing device according to claim 6, wherein the configuration module is further operable to update information of the distance table when the remote base stations proximate the base station are changed.

12. A non-transitory storage medium storing a set of instructions, the set of instructions being executed by a processor of a computing device, causing the computing device to perform a communication signal transmission management method of a base station, the method comprising:
  (a) configuring a distance table for recording a plurality of remote base stations proximate the base station and a distance between the base station and each of the remote base stations, and storing the distance table in a storage system of the computing device;
  (b) receiving a communication signal from a communication device around the base station;
  (c) detecting whether a destination of the communication signal is the base station;
  (d) detecting whether the destination is any remote base station recorded in the distance table if the destination is not the base station;
  (e) upon the condition that the destination is one of the remote base stations recorded the distance table, transmitting the communication signal to the remote base station corresponding to the detected destination; or
  upon the condition that the destination is none of the remote base stations recorded in the distance table, executing block (f) to (h):
  (f) acquiring a current load of each of the remote base stations recorded in the distance table;
  (g) determining one of the remote base stations to receive the communication signal according to the acquired current load and the distance between the base station and each of the remote base stations; and
  (h) transmitting the communication signal to the determined remote base station.

13. The non-transitory storage medium as claimed in claim 12, wherein the block (a) comprises:
  triggering a laser ranging device of the base station to scan the remote base stations proximate the base station;
  measuring the distance between the base station and each of the scanned remote base stations; and
  recording the distance and the scanned remote base stations in the distance table according a distance order from a minimum distance to a maximal distance between the base station and each of the remote base stations.

14. The non-transitory storage medium as claimed in claim 13, wherein the block (g) comprises:
  checking whether the current load of each of the remote base stations is less than a determined value one by one according to the distance order; and
  determining a remote base station for receiving the communication signal when the current load of the remote base station is checked less than the determined value.

15. The non-transitory storage medium as claimed in claim 12, wherein the method further comprises:
  updating information of the distance table when the remote base stations proximate the base station are changed.

16. The non-transitory storage medium as claimed in claim 12, wherein the computing device is a computer or a server electronically or wirelessly connected with the base station.

* * * * *